United States Patent
Fukui

(10) Patent No.: US 9,765,800 B2
(45) Date of Patent: Sep. 19, 2017

(54) PISTON ASSEMBLY, FLUID PRESSURE CYLINDER, METHOD FOR MANUFACTURING PISTON ASSEMBLY

(75) Inventor: Chiaki Fukui, Abiko (JP)

(73) Assignee: SMC KABUSHIKI KAISHA, Tokyo (JP)

(*) Notice: Subject to any disclaimer, the term of this patent is extended or adjusted under 35 U.S.C. 154(b) by 434 days.

(21) Appl. No.: 14/122,902

(22) PCT Filed: May 22, 2012

(86) PCT No.: PCT/JP2012/063083
§ 371 (c)(1),
(2), (4) Date: Nov. 27, 2013

(87) PCT Pub. No.: WO2012/165232
PCT Pub. Date: Dec. 6, 2012

(65) Prior Publication Data
US 2014/0076157 A1    Mar. 20, 2014

(30) Foreign Application Priority Data
Jun. 3, 2011  (JP) .................. 2011-124756

(51) Int. Cl.
*F16J 1/00*  (2006.01)
*F15B 15/14*  (2006.01)
(Continued)

(52) U.S. Cl.
CPC ........ *F15B 15/1447* (2013.01); *B23K 11/006* (2013.01); *B23K 11/14* (2013.01);
(Continued)

(58) Field of Classification Search
CPC ............. F15B 15/1447; F15B 15/1452; B23K 11/006; B23K 2201/003; F16J 1/008;
(Continued)

(56) References Cited

U.S. PATENT DOCUMENTS

| 48,851 A | * | 7/1865 | Sterens | ...................... F16J 9/00 |
| --- | --- | --- | --- | --- |
| | | | | 92/257 |
| 2,878,085 A | * | 3/1959 | Barnhart | ............... F04B 53/143 |
| | | | | 277/438 |

(Continued)

FOREIGN PATENT DOCUMENTS

| CH | 204322 | * | 4/1939 | ............... F16J 1/008 |
| --- | --- | --- | --- | --- |
| CH | 204322 A | | 4/1939 | |

(Continued)

OTHER PUBLICATIONS

CH204322A eSpacenet Machine Translation.*
(Continued)

*Primary Examiner* — F. Daniel Lopez
*Assistant Examiner* — Dustin T Nguyen
(74) *Attorney, Agent, or Firm* — Oblon, McClelland, Maier & Neustadt, L.L.P.

(57) ABSTRACT

A piston main body in a piston assembly of a fluid pressure cylinder includes a first piston member and a second piston member including a plate-shaped member. The first piston member and the second piston member are joined in a state overlapping in the axial direction of a piston rod. The second piston member is not provided with a hole that passes through in the plate thickness direction.

13 Claims, 13 Drawing Sheets

(51) Int. Cl.
*F16J 1/12* (2006.01)
*B23K 11/00* (2006.01)
*B23K 11/14* (2006.01)
*B23K 11/16* (2006.01)
*B23K 11/18* (2006.01)
*F15B 15/28* (2006.01)
*B23K 101/00* (2006.01)
*B23K 103/02* (2006.01)
*B23K 103/04* (2006.01)
*B23K 103/10* (2006.01)

(52) U.S. Cl.
CPC ............ *B23K 11/16* (2013.01); *B23K 11/185* (2013.01); *F16J 1/008* (2013.01); *F16J 1/12* (2013.01); *B23K 2201/003* (2013.01); *B23K 2203/02* (2013.01); *B23K 2203/04* (2013.01); *B23K 2203/05* (2015.10); *B23K 2203/10* (2013.01); *F15B 15/2807* (2013.01)

(58) Field of Classification Search
CPC ...... F16J 1/12; F16J 1/005; F16J 1/006; F16J 1/10; F16J 7/00; F16J 9/00; F16J 15/3204; F04B 53/143
USPC ......... 92/128, 163, 165, 166, 179, 216, 255, 92/260, 256, 257, 258, 259, 240, 241, 92/242–254
See application file for complete search history.

(56) References Cited

U.S. PATENT DOCUMENTS

| | | | | |
|---|---|---|---|---|
| 3,171,334 | A * | 3/1965 | Rasmussen | F15B 15/149 277/346 |
| 3,752,367 | A * | 8/1973 | Sundholm | F04B 53/14 222/256 |
| 4,370,918 | A * | 2/1983 | Pringle | B60T 17/081 92/163 |
| 5,680,913 | A * | 10/1997 | Wood | F16F 9/48 188/285 |
| 6,499,384 | B1 * | 12/2002 | Blair | F01L 15/12 91/224 |
| 2007/0048156 | A1 | 3/2007 | Chung et al. | |
| 2007/0079777 | A1 * | 4/2007 | Hurlstone | A61M 5/2046 123/46 R |
| 2009/0107781 | A1 * | 4/2009 | Fritz | F16F 9/585 188/280 |
| 2011/0120300 | A1 | 5/2011 | Fletcher et al. | |

FOREIGN PATENT DOCUMENTS

| | | |
|---|---|---|
| CN | 201016390 Y | 2/2008 |
| CN | 102089531 A | 6/2011 |
| GB | 366781 | 2/1932 |
| JP | 58-123957 * | 8/1983 |
| JP | 58 123957 | 8/1983 |
| JP | 63 004406 | 1/1988 |

OTHER PUBLICATIONS

International Search Report Issued Jun. 19, 2012 in PCT/JP12/063083 Filed May 22, 2012.

Combined Office Action and Search Report issued Sep. 25, 2015 in Chinese Patent Application No. 201280026561.8 (with English language translation).

Combined Office Action and Search Report issued Apr. 3, 2015 in Chinese Patent Application No. 201280026561.8 (with English language translation).

Extended European Search Report issued Apr. 22, 2015 in Patent Application No. 12792299.5.

* cited by examiner

FIG. 2A
FIG. 2B
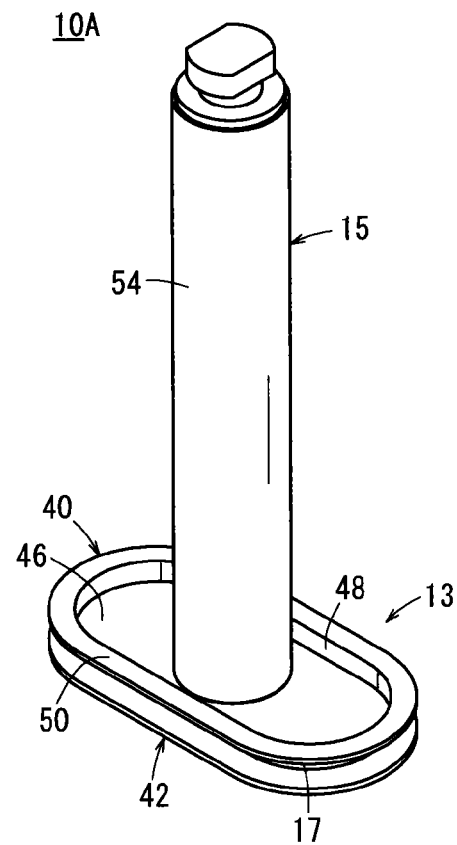
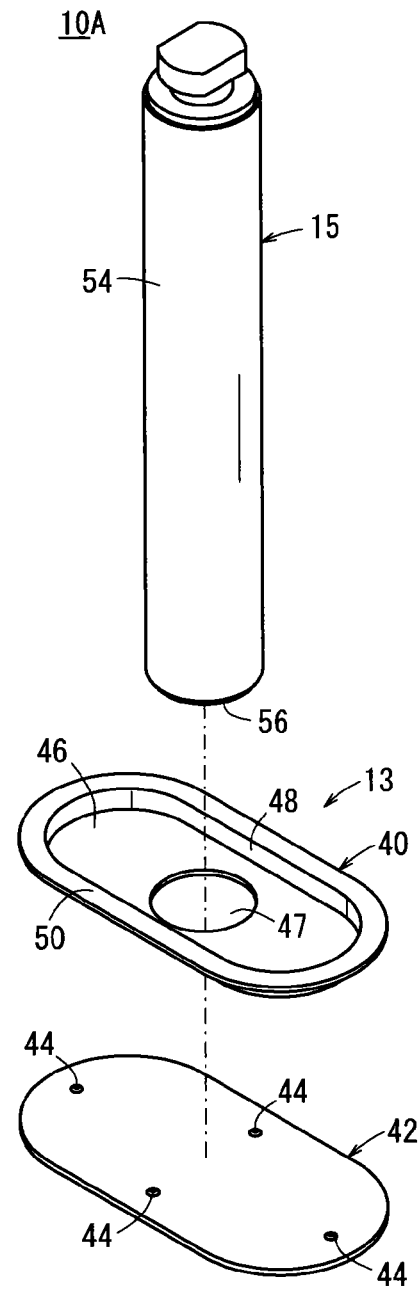

FIG. 4A
FIG. 4B
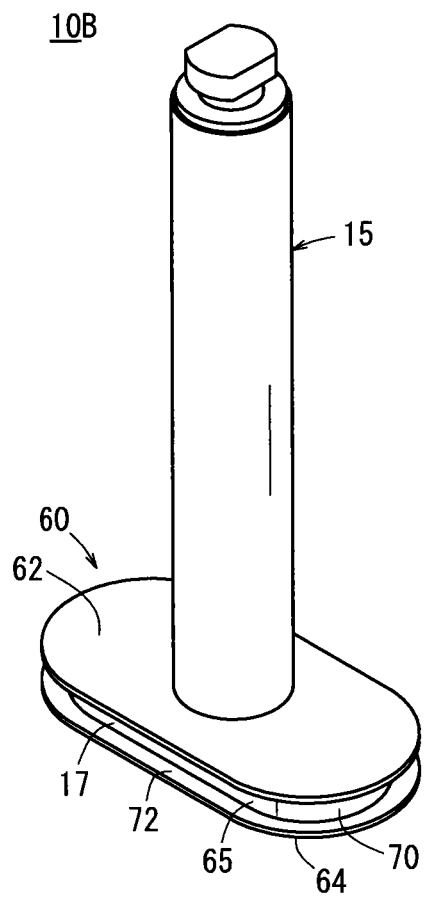
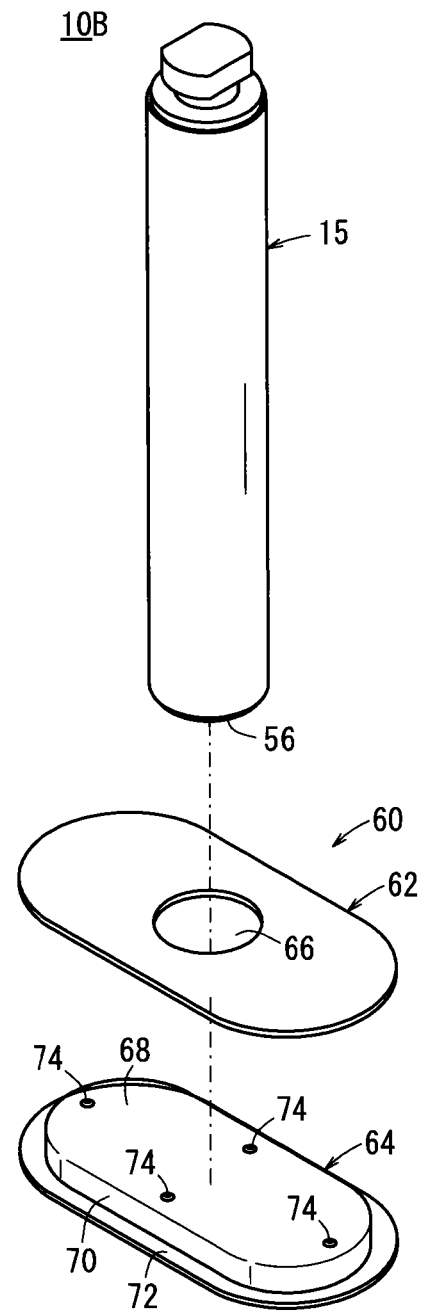

FIG. 6A
FIG. 6B
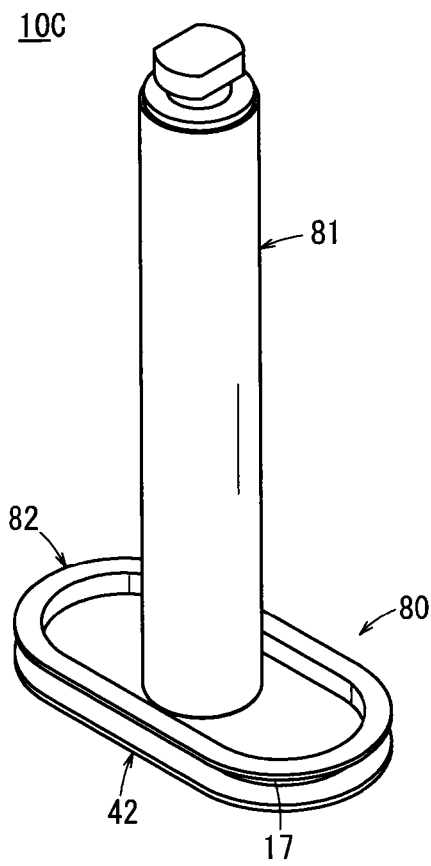
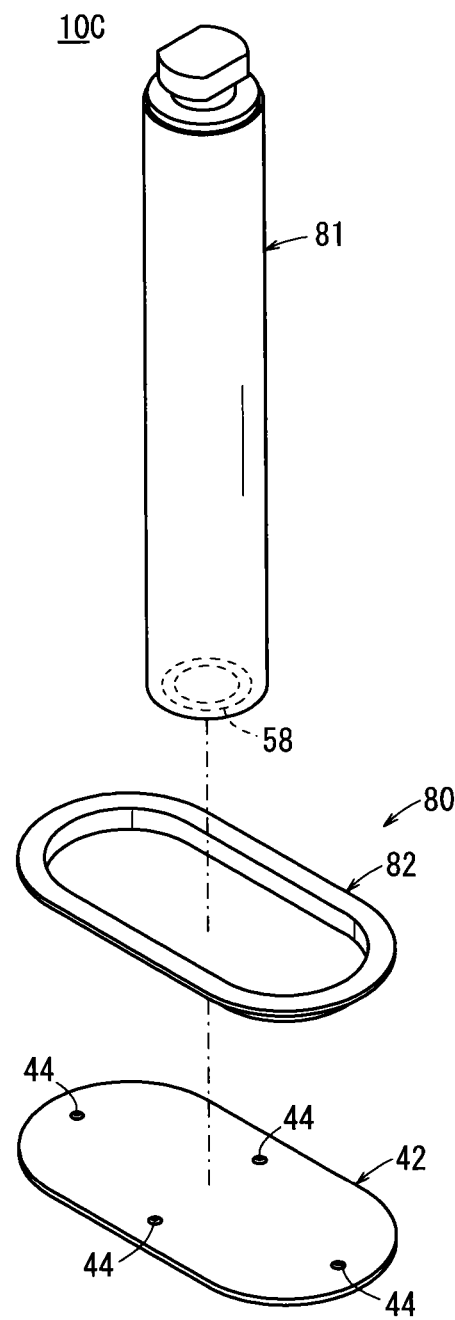

FIG. 8A
FIG. 8B
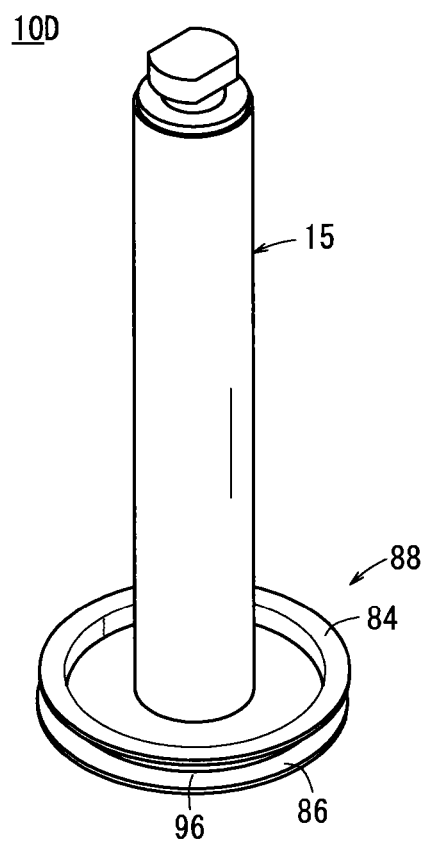
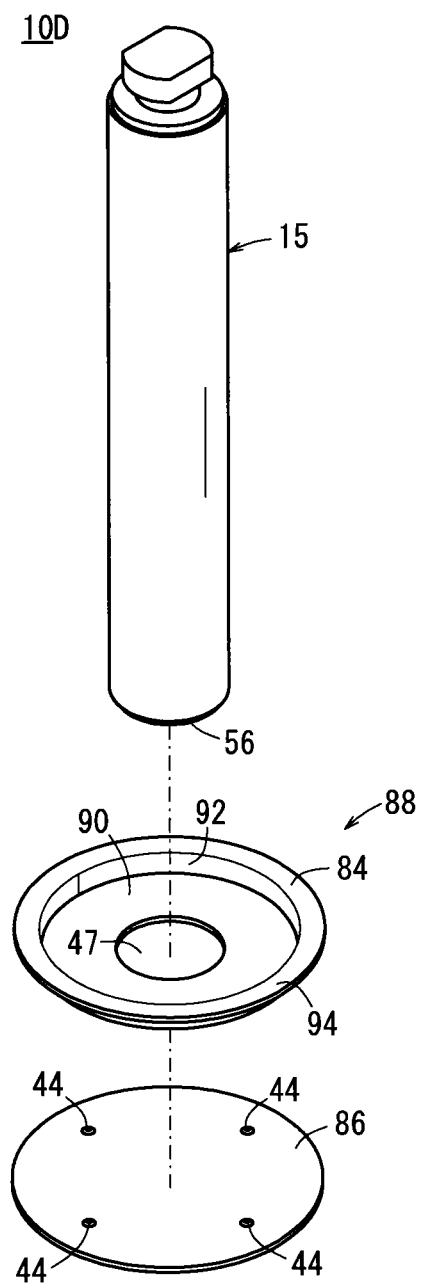

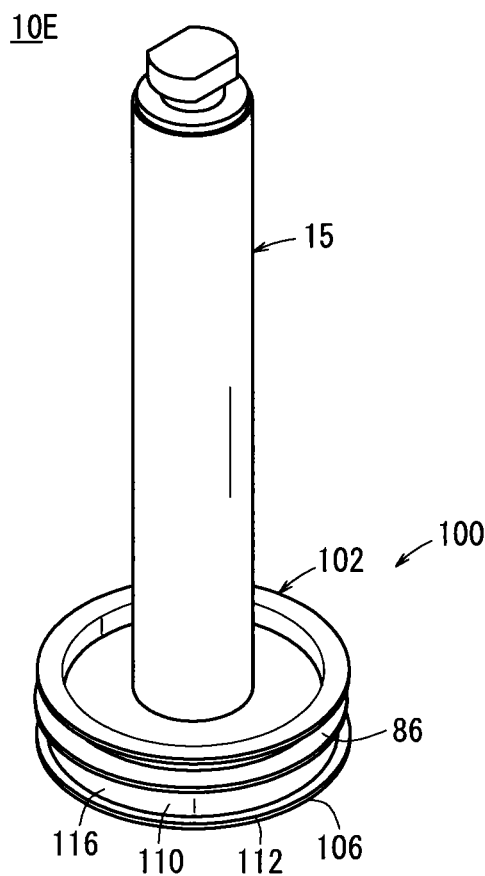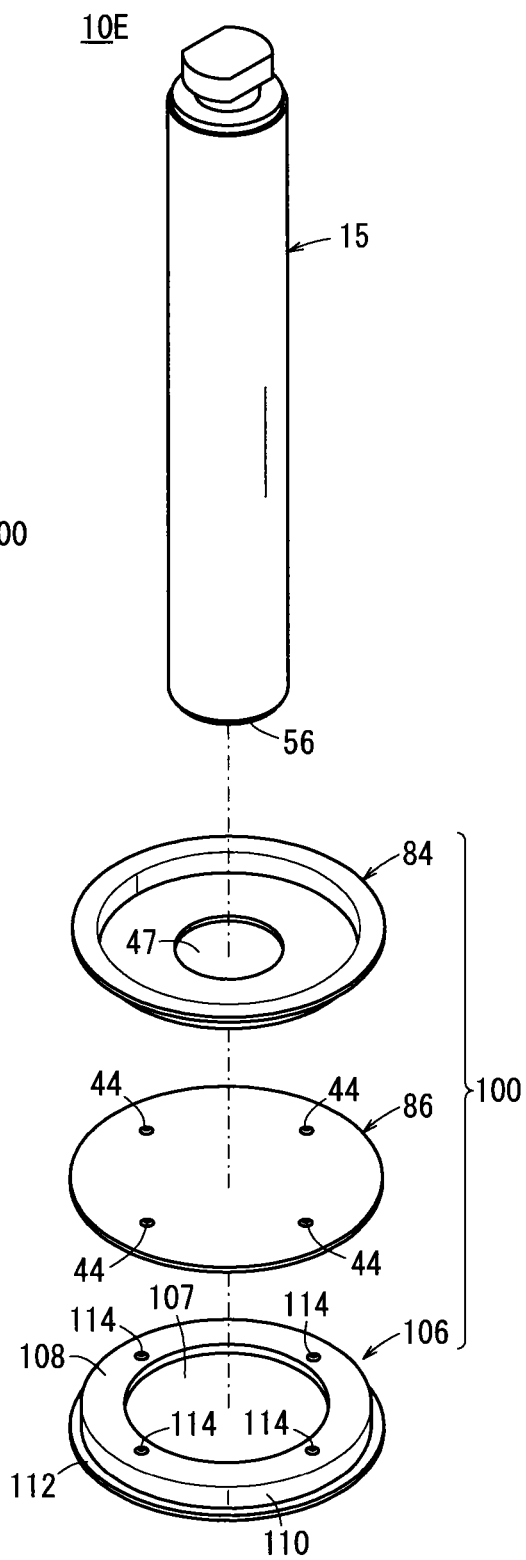

PISTON ASSEMBLY, FLUID PRESSURE CYLINDER, METHOD FOR MANUFACTURING PISTON ASSEMBLY

TECHNICAL FIELD

The present invention relates to a piston assembly having a piston main body and a piston rod joined to the piston main body, a fluid pressure cylinder including the piston assembly, and a method for manufacturing the piston assembly.

BACKGROUND ART

A known type of fluid pressure cylinder includes a cylinder, a piston disposed for displacement in an axial direction in the interior of the cylinder, and a piston rod connected to the piston. The fluid pressure cylinder is constituted such that the piston rod, which is connected to the piston, undergoes movement upon displacement of the piston by a fluid pressure. As a method for joining the piston and the piston rod, generally, a method by way of screw-engagement or a method that involves crimping is adopted. With the screw-engagement method, a screw hole (female screw threads) that penetrates through the piston in the axial direction is provided, whereas male screw threads are provided on one end of the piston rod, and the piston rod is attached directly to the piston by screw-engagement, or alternatively, a drill hole is provided in the piston, and the piston and the piston rod are joined by fastening a nut or the like to one end of the piston rod after the one end is inserted into the drill hole of the piston (see, for example, FIG. 10 of Japanese Laid-Open Utility Model Publication No. 58-123957). With the crimping method, a through hole is provided that penetrates in the axial direction of the piston, and after the piston rod has been inserted into the through hole, a portion of the piston is plastically deformed in order to join the piston and the piston rod to one another (see, for example, FIG. 1 of Japanese Laid-Open Utility Model Publication No. 63-004406).

In the case of the aforementioned screw-engagement method, it is difficult for an airtight state to be maintained by the threads, and therefore, a seal member such as a separate O-ring must be provided on the fastening portion, and a process is required to provide a groove for installation of the seal member. Further, in the case of the screw-engagement method, a certain length for the screw is required in order to impart a strength sufficient to withstand the force generated by the fluid pressure, and it is difficult to shorten the length of the apparatus as a whole.

With the crimping method, in order to provide sealing between the piston and the piston rod, a seal member must be disposed on the fitted portion, and a process is required to provide a groove for installation of the seal member. A certain amount of sealing capability may be imparted by plastic deformation of metal, however, in this case, there is a concern that a sufficient sealing capability cannot be obtained.

SUMMARY OF INVENTION

The present invention has been made taking into consideration the aforementioned problems, and has an object of providing a piston assembly, a fluid pressure cylinder, and a method for manufacturing the piston assembly, in which it is unnecessary to dispose a seal member between the piston and the piston rod, and which enables the total length of the product to be shortened.

To accomplish the aforementioned object, a piston assembly of the present invention comprises a piston main body, and a piston rod joined to the piston main body, wherein the piston main body includes a first piston member and a second piston member which are constituted from plate-like members, the first piston member and the second piston member are joined mutually under a condition of being superimposed in an axial direction of the piston rod, a seal installation groove that extends in a circumferential direction is formed between an outer peripheral edge of the first piston member and an outer peripheral edge of the second piston member, and at least one of the first piston member and the second piston member has a plate thickness over the entirety thereof.

With the piston assembly of the present invention, since the piston main body is constructed from the first piston member and the second piston member which are constituted from plate-like members, the width of the piston (thickness in the axial direction) can be shortened, and the total length of the device of the fluid pressure cylinder in which the piston assembly is incorporated can be made shorter accordingly, while also enabling the cost of the device to be lowered. Further, since a through hole does not exist that penetrates in the axial direction through the piston main body, it is essentially unnecessary for a seal member to be disposed between the piston main body and the piston rod, thus enabling elimination of the seal member and a reduction in the number of parts. In addition, since a seal member is unneeded, provision of a sealing groove for installation thereof also is unnecessary, thus enabling the structure to be simplified. Further, in contradistinction to a structure equipped with a sealing function imparted by means of plastic deformation, such as by crimping or the like, concerns over reliability of the sealing function can fundamentally be avoided.

In the above-described piston assembly, a through hole may be disposed in the first piston member so as to penetrate in the plate thickness direction, and a fitting portion that is fitted in the through hole may be formed to project on one end of the piston rod.

According to the above structure, when the piston main body and the piston rod are welded, the fitting portion provided on the one end of the piston rod is fitted in the through hole provided in the first piston member, whereby positioning of the piston rod with respect to the piston main body can be carried out easily and accurately.

In the above-described piston assembly, the piston main body may include a third piston member constituted from a plate-like member, and on an outer peripheral portion of the piston main body, a support member or a magnet that extends along the outer circumference of the piston main body may be disposed in a groove formed between the second piston member and the third piston member.

According to the above structure, a piston assembly can be provided in which, even while equipped with the support member or the magnet, the total length thereof can be made shorter by shortening the width of the piston main body.

In the above-described piston assembly, the piston rod may be joined as a first piston rod to one side of the piston main body by welding, and a second piston rod may be joined to another side of the piston main body.

Due to the above structure, even in the case of a double rod type of piston assembly, the total length of the cylinder can be made shorter by shortening the width of the piston main body, the device can be made smaller in scale as a whole, and the cost of the device can be lowered.

In the above-described piston assembly, the first piston member and the second piston member may be joined by welding, and the piston main body and the piston rod may also be joined by welding.

According to the above structure, the first piston member and the second piston member can be joined reliably without providing a hole that penetrates in the thickness direction through the first piston member or the second piston member.

Further, a fluid pressure cylinder according to the present invention comprises the piston assembly as described above, together with a housing that accommodates the piston assembly therein movably in the axial direction.

According to the above-described fluid pressure cylinder, since the total length of the piston assembly can be shortened, the total length of the fluid pressure cylinder can be shortened as well.

Further, a method for manufacturing a piston assembly according to the present invention comprises a first step of superimposing a first piston member and a second piston member which are constituted from plate-like members, and joining both members to obtain a piston main body, and a second step of joining a piston rod to the piston main body, wherein a seal installation groove that extends in a circumferential direction is formed between an outer peripheral edge of the first piston member and an outer peripheral edge of the second piston member, and at least one of the first piston member and the second piston member has a plate thickness over the entirety thereof.

According to the above-described manufacturing method, the width of the piston (thickness in the axial direction) can be shortened, and since a seal member between the piston main body and the piston rod can be eliminated, the number of parts can be reduced, and the structure can be simplified by rendering unnecessary a seal groove for installation of the seal member.

In the first step, the first piston member and the second piston member may be joined by welding, and in the second step, the piston main body and the piston rod may be joined by welding.

According to the above structure, the first piston member and the second piston member can be joined reliably without providing a hole that penetrates in the thickness direction through the first piston member or the second piston member.

According to the piston assembly, the fluid pressure cylinder, and the method for manufacturing a piston assembly according to the present invention, it is unnecessary for a seal member to be disposed between the piston main body and the piston rod, and the total length of the cylinder device can be shortened, or alternatively, if the piston assembly is incorporated in a cylinder device of the same length as a conventional cylinder device, an advantage is obtained in that the stroke of the cylinder device can be lengthened.

The aforementioned objects, and other objects, characteristics, and advantages of the present invention will become more apparent from the following descriptions of preferred embodiments when taken in conjunction with the accompanying drawings.

BRIEF DESCRIPTION OF DRAWINGS

FIG. 2A is a perspective view of the piston assembly shown in FIG. 1;

FIG. 2B is an exploded perspective view of the piston assembly shown in FIG. 1;

FIG. 4A is a perspective view of a piston assembly according to a second embodiment of the present invention;

FIG. 4B is an exploded perspective view of the piston assembly shown in FIG. 4A;

FIG. 6A is a perspective view of a piston assembly according to a third embodiment of the present invention;

FIG. 6B is an exploded perspective view of the piston assembly shown in FIG. 6A;

FIG. 8A is a perspective view of a piston assembly according to a fourth embodiment of the present invention;

FIG. 8B is an exploded perspective view of the piston assembly shown in FIG. 8A;

FIG. 10A is a perspective view of a piston assembly according to a fifth embodiment of the present invention;

FIG. 10B is an exploded perspective view of the piston assembly shown in FIG. 10A;

DESCRIPTION OF EMBODIMENTS

Below, descriptions will be given with reference to the accompanying drawings of preferred embodiments of a piston assembly, a fluid pressure cylinder, and a method for manufacturing the piston assembly according to the present invention.

First Embodiment

Figure 1:
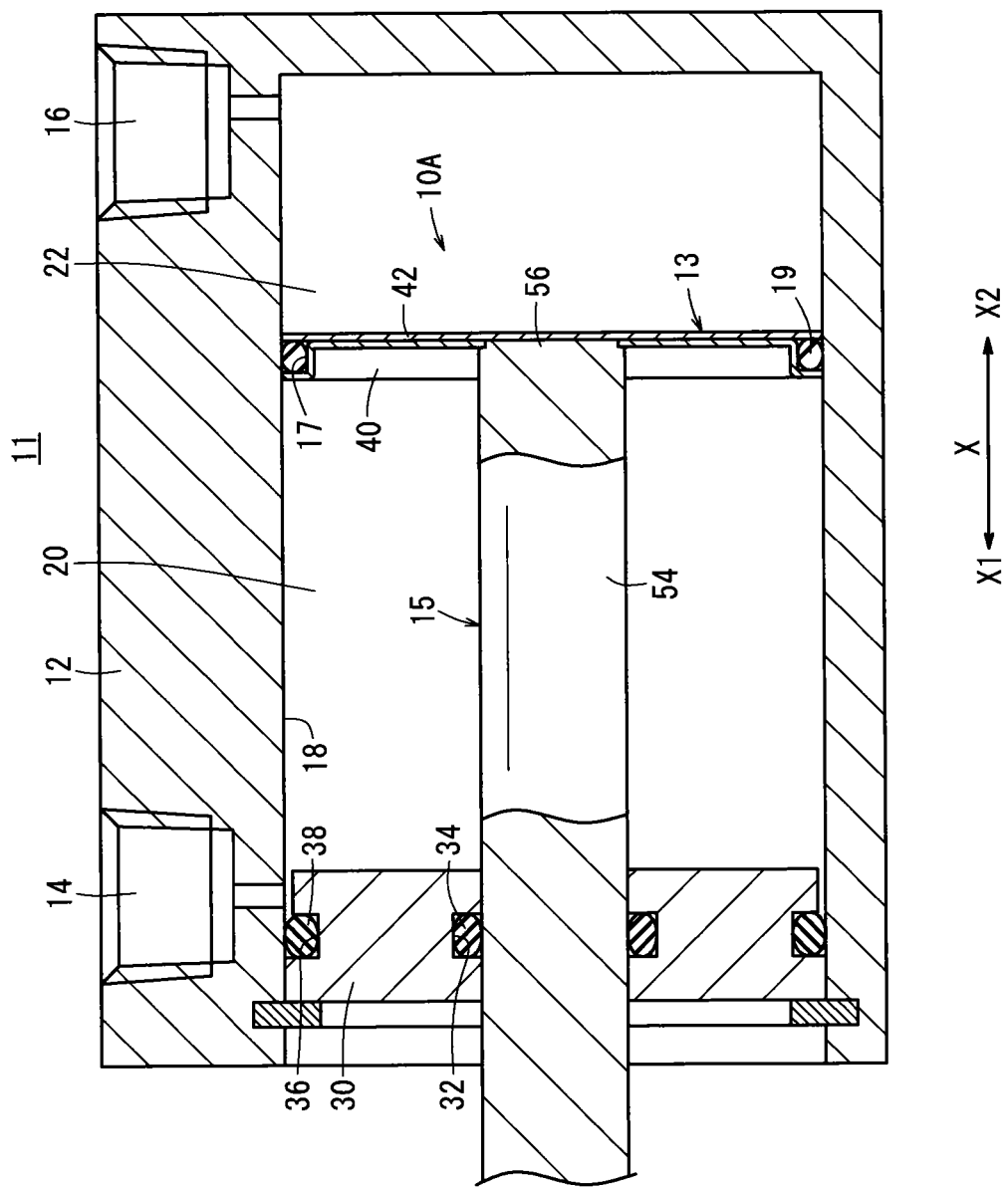
FIG. 1 is a partially omitted vertical cross sectional view taken along an axial direction of a fluid pressure cylinder equipped with a piston assembly according to a first embodiment of the present invention.

FIG. 1 is a partially omitted vertical cross sectional view taken along an axial direction of a fluid pressure cylinder 11 equipped with a piston assembly 10A according to a first embodiment of the present invention. The fluid pressure cylinder 11 comprises, as basic constituent elements thereof, a housing (cylinder main body) 12, a piston main body 13 disposed movably in the axial direction in the interior of the housing 12, and a piston rod 15 connected to the piston main body 13. Under an action of a fluid pressure, the piston main body 13 is moved in the axial direction within the housing 12, whereby the piston rod 15, which is connected to the piston main body 13, is moved reciprocally.

The housing 12 is constituted from a metal material such as an aluminum alloy or the like, which is equipped with a pair of ports 14, 16, and in the interior thereof is provided with a slide hole (cylinder chamber) 18 that communicates with the ports 14, 16. In the interior of the slide hole 18, the piston main body 13 is movable reciprocally in an axial direction within a certain restricted range.

The piston main body 13 is accommodated inside the housing 12. The piston main body 13 is a displaceable body that is displaceable in the axial direction (the direction of the arrow X in FIG. 1) of the slide hole 18 in a state in which the piston main body 13 partitions the interior of the housing 12 into a pressure chamber 20 on the side of one port 14 and a pressure chamber 22 on the side of the other port 16. On an outer circumference of the piston main body 13, a seal installation groove 17 is formed to extend along the outer circumference of the piston main body 13. A seal member (piston packing) 19 made from an elastic material (e.g., a rubber material) is mounted in the seal installation groove 17.

The seal member 19 projects outwardly from an outermost circumferential portion of the piston main body 13 so as to circumferentially extend around the piston main body 13. The seal member, for example, is an O-ring made from an elastic material such as synthetic rubber or the like. The seal member 19 provides sealing between the inner circumferential surface of the slide hole 18 and the outer circumferential surface of the piston main body 13, and the interior of the housing 12 are partitioned into the two pressure chambers 20, 22 in an airtight (or fluidtight) manner.

A proximal end (an end in the direction of the arrow X2) of the piston rod 15 is connected to the piston main body 13, and a distal end (an end in the direction of the arrow X1) of the piston rod 15 penetrates through a rod cover 30 that closes one end of the slide hole 18, and extends out to the exterior of the slide hole 18. In the present embodiment, the piston assembly 10A is constituted from the piston main body 13 and the piston rod 15.

A seal member 34, which is made from an elastic material and provides sealing between an inner circumferential surface of the rod cover 30 and an outer circumferential surface of the piston rod 15, is installed in an annular groove 32 formed on an inner circumferential part of the rod cover 30. A seal member 38, which is made from an elastic material and provides sealing between the outer circumferential surface of the rod cover 30 and an inner circumferential surface of the slide hole 18, is installed in an annular groove 36 formed on an outer circumferential part of the rod cover 30.

With the fluid pressure cylinder 11 constructed in the foregoing manner, from the aforementioned two ports 14, 16, a pressure fluid such as pressurized air or the like is supplied to and discharged from the two pressure chambers 20, 22, whereby the piston main body 13 is moved reciprocally in the axial direction of the slide hole 18, and the piston rod 15 undergoes advancing and retreating movements.

FIG. 2A is a perspective view of the piston assembly 10A shown in FIG. 1. FIG. 2B is a perspective view of constituent components prior to assembly (before joining) of the piston assembly 10A shown in FIG. 1. The aforementioned piston main body 13 is constituted from a first piston member 40 and a second piston member 42. More specifically, the piston assembly 10A is constituted from the first piston member 40, the second piston member 42, and the piston rod 15.

Each of the first piston member 40 and the second piston member 42 is an oval (substantially elliptical) plate-like member in its entirety, which is formed by plastic deformation (e.g., press working) of a metallic plate, and the first piston member 40 and the second piston member 42 are joined together mutually by welding. As will be described later, with the present embodiment, the first piston member 40 and the second piston member 42 are joined by projection welding.

The first piston member 40 includes a flat oval base member 46, a side circumferential wall portion 48 that extends out in the axial direction from the entire circumference of the rim of the base member 46, and a flange 50 that spreads outwardly over the entire circumference from an end (an end on the distal end side of the piston rod 15) of the side circumferential wall portion 48. A circular through hole 47 is formed in the center of the base member 46 in the plate-thickness direction thereof.

The second piston member 42 is an oval flat plate in its entirety, and as shown in FIG. 2B, prior to welding the first piston member 40 and the second piston member 42, a plurality of (four as exemplified in the drawing) welding projections (first welding projections) 44 are disposed on a surface of the second piston member 42 that is to be joined with the first piston member 40. The second piston member 42 has a predetermined plate-thickness in its entirety, and has no hole that penetrates in the plate-thickness direction thereof.

The shape and size of the profile of the flange 50 of the first piston member 40, and the shape and size of the profile of the second piston member 42 are substantially the same. The seal installation groove 17 extends circumferentially between the outer peripheral edge of the second piston member 42 and the outer peripheral edge of the first piston member 40. More specifically, the seal installation groove 17 extends in an oval shape, which is the same as that of the piston main body 13 (the first piston member 40 and the second piston member 42).

The piston rod 15 of the illustrated example includes a cylindrical body portion 54. On a proximal end of the body portion 54, there is formed a circular fitting portion 56, which projects concentrically with the body portion 54 (see FIGS. 3C and 3D). The fitting portion 56 has an outer diameter, which is smaller than that of the body portion 54 of the piston rod 15. The outer diameter thereof is the same as, or slightly smaller than, the inner diameter of the through hole 47 provided on the first piston member 40. A circular shaped stepped portion is formed due to the different outer diameters of the body portion 54 and the fitting portion 56.

The piston rod 15, prior to welding of the piston rod 15 and the piston main body 13, further includes a welding projection (second welding projection) 58, which is formed to project in the direction of the proximal end from a location in the vicinity of the peripheral edge portion of the fitting portion 56. The welding projection 58 in the illustrated example is formed in a circular ring shape. However, the welding projection 58 may also be constituted as a plurality of point-like projections or as a plurality of linear projections.

The constituent materials of the first piston member 40, the second piston member 42, and the piston rod 15 are not particularly limited, insofar as they are materials (metals) capable of being welded, and are capable of ensuring the requisite strength. Suitable materials that can be used include, for example, iron and steel, stainless steel, aluminum, aluminum alloys, etc.

Figure 3A:
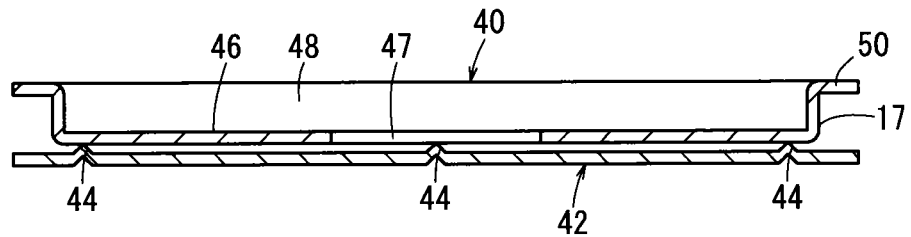
FIG. 3A is a vertical cross sectional view prior to welding of a first piston member and a second piston member.
Figure 3B:
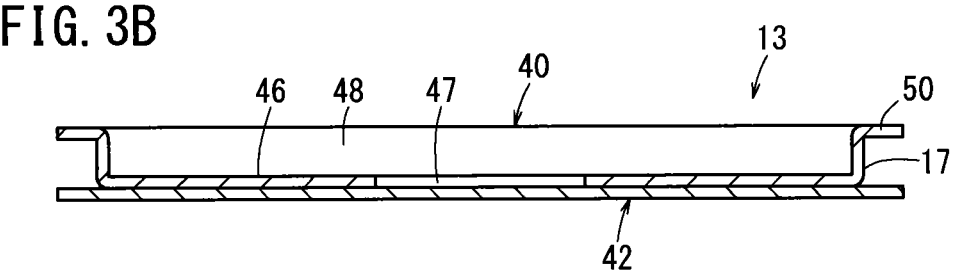
FIG. 3B is a vertical cross sectional view after welding of the first piston member and the second piston member.

Next, a manufacturing method (assembly method) for the piston assembly 10A will be described. First, the first piston member 40, the second piston member 42, and the piston rod 15, which are formed in the shapes shown in FIG. 2B, are prepared. In addition, the first piston member 40 and the second piston member 42 are joined mutually by projection welding. In this case, more specifically, as shown in FIG. 3A, in a condition in which the first piston member 40 and the second piston member 42 are superimposed concentrically and pressure is applied thereto, both members are energized electrically. Upon being energized, the welding projections 44 provided on the second piston member 42 are melted by resistance heating, and as shown in FIG. 3B, the first piston member 40 and the second piston member 42 are joined mutually. In this manner, the piston main body 13 made up from the first piston member 40 and the second piston member 42 is manufactured.

In this case, alternatively, the first piston member 40 and the second piston member 42 may be joined integrally by an adhesive, without providing the welding projections 44 on the second piston member 42.

Figure 3C:
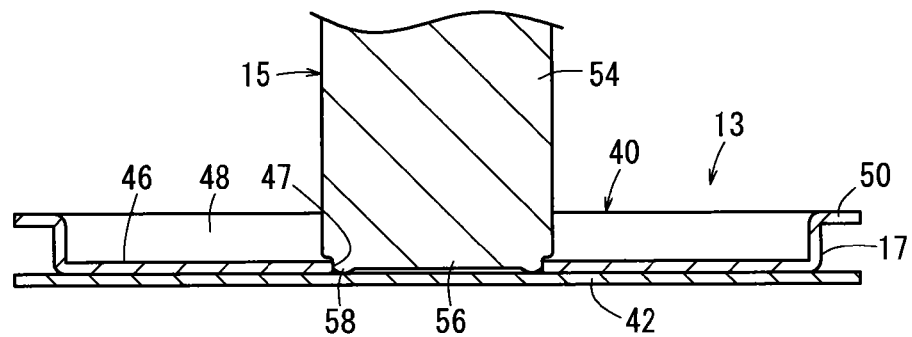
FIG. 3C is a vertical cross sectional view prior to welding of a piston main body and a piston rod.

Next, the piston main body 13 and the piston rod 15 are joined mutually by projection welding. Specifically, first, as shown in FIG. 3C, the piston rod 15 is placed in confronting relation against the piston main body 13. More specifically, the fitting portion 56 provided on the proximal end of the piston rod 15 is fitted into the through hole 47 disposed in the first piston member 40. Consequently, positioning of the piston rod 15 with respect to the piston main body 13 can be performed easily and accurately. Further, at this time, the welding projection 58 provided on the piston rod 15 abuts against the second piston member 42.

Figure 3D:
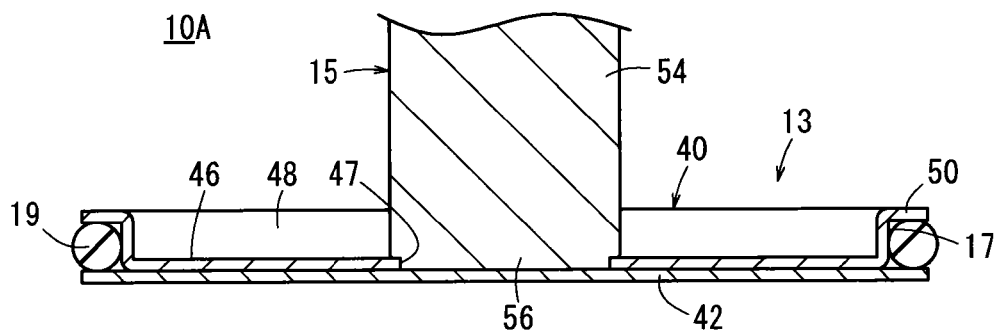
FIG. 3D is a vertical cross sectional view after welding of the piston main body and the piston rod.

In addition, in a condition in which pressure is applied to the piston rod 15 and the piston main body 13 in the axial direction, both members are energized electrically. Upon being energized, the welding projection 58 provided on the piston rod 15 is melted by resistance heating, and as shown in FIG. 3D, the piston main body 13 (second piston member 42) and the piston rod 15 are joined mutually. Consequently, the piston assembly 10A, which is constituted from the first piston member 40, the second piston member 42, and the piston rod 15, is obtained. The seal member 19 is mounted on the outer periphery (in the seal installation groove 17) of the piston main body 13 of the piston assembly 10A, which is manufactured in the foregoing manner, and as shown in FIG. 1, the piston assembly 10A is arranged slidably in the interior of the housing 12, to thereby be assembled as the fluid pressure cylinder 11.

In this case, alternatively, the piston rod 15 and the piston main body 13 may be joined integrally by an adhesive, without providing the welding projection 58 on the piston rod 15.

The fluid pressure cylinder 11 equipped with the piston assembly 10A according to the present embodiment is constructed basically as described above. Next, operations and advantages thereof will be explained.

With the piston assembly 10A, since the piston main body 13 is constructed from the first piston member 40 and the second piston member 42, which are made from plate-like members, compared to a piston main body having a considerable thickness, which is obtained by a forging or a cutting and machining process as in the conventional technique, the width of the piston main body 13 (thickness in the axial direction) can be shortened, and the total length of the fluid pressure cylinder 11 in which the piston assembly 10A is incorporated can be made shorter accordingly, while also enabling the cost of the fluid pressure cylinder 11 to be lowered. Alternatively, even if the fluid pressure cylinder 11 is of the same length as the conventional device, by shortening the width (length in the axial direction) of the piston main body 13, the stroke of the piston main body 13 can be lengthened. More specifically, without increasing the size and scale of the fluid pressure cylinder 11, an advantage is achieved in that the stroke can be increased in length.

Although the through hole 47 is disposed in the first piston member 40, a hole that penetrates in the plate-thickness direction is not provided in the second piston member 42. Thus, a hole does not exist that penetrates axially through the piston main body 13 as a whole. In this manner, because there is no hole that penetrates axially through the piston main body 13, it is essentially unnecessary for a seal member to be disposed between the piston main body 13 and the piston rod 15, thus enabling elimination of such a seal member and a commensurate reduction in the number of parts. In addition, since such a seal member is unneeded, the provision of a sealing groove for installation thereof also is unnecessary, thus enabling the structure to be simplified. Furthermore, in contradistinction to a structure equipped with a sealing function imparted by means of plastic deformation, such as by crimping or the like, concerns over reliability of the sealing function can fundamentally be avoided.

With the piston assembly 10A according to the present embodiment, the through hole 47 in the plate-thickness direction is provided in the first piston member 40, and the fitting portion 56 that is fitted in the through hole 47 is formed to project on the one end of the piston rod 15. Accordingly, when the piston main body 13 and the piston rod 15 are welded, the fitting portion 56 provided on the one end of the piston rod 15 is fitted in the through hole 47 provided in the first piston member 40, whereby positioning of the piston rod 15 with respect to the piston main body 13 can be performed easily and accurately.

Second Embodiment

Figure 5:
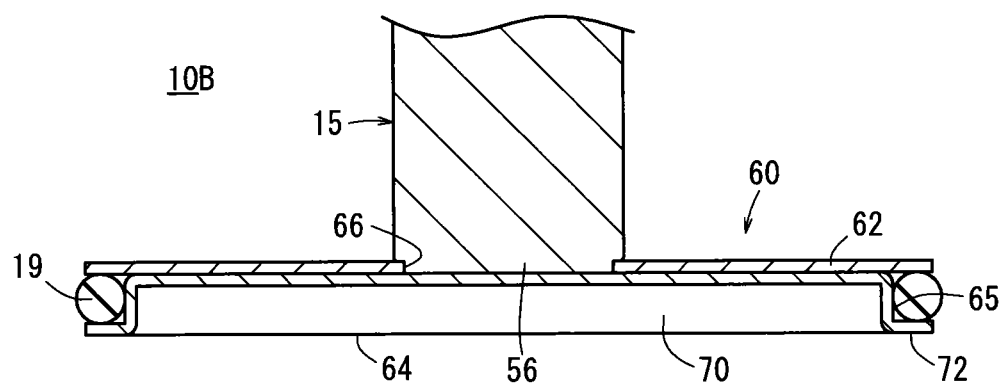
FIG. 5 is a vertical cross sectional view of a condition in which a seal member of the piston assembly shown in FIG. 4A is installed.

Next, with reference to FIGS. 4A through 5, a piston assembly 10B according to a second embodiment will be described. In the piston assembly 10B according to the second embodiment, elements thereof, which impart the same functions and effects as those of the piston assembly 10A according to the first embodiment, are denoted by the same reference characters and details thereof are omitted.

The piston assembly 10B according to the second embodiment is equipped with a piston main body 60, the structure of which differs from that of the piston main body 13 shown in FIG. 1, etc. The piston main body 60 is constituted from a first piston member 62 and a second piston member 64.

Each of the first piston member 62 and the second piston member 64 is an oval plate-like member in its entirety, which is formed by plastic deformation (e.g., press working) of a metallic plate, and the first piston member 62 and the second piston member 64 are joined together mutually by welding. As will be described later, with the present embodiment, the first piston member 62 and the second piston member 64 are joined by projection welding.

The first piston member 62 is substantially flat and oval over its entirety. As shown in FIG. 4B, a circular through hole 66 is formed that penetrates in the plate-thickness direction in the center of the first piston member 62. The inner diameter of the through hole 66 is the same or slightly larger than the outer diameter of the fitting portion 56 of the piston rod 15.

The second piston member 64 includes a flat oval base member 68, a side circumferential wall portion 70 that extends out in the axial direction from the entire circumference of the rim of the base member 68, and a flange 72 that spreads outwardly over the entire circumference from an end (an end on the side away from the piston rod 15) of the side circumferential wall portion 70. Prior to welding the first piston member 62 and the second piston member 64, a plurality of (four as exemplified in the drawing) welding projections 74 are disposed on a surface of the second piston member 64 that is to be joined with the first piston member 62. The second piston member 64 has a predetermined plate-thickness in its entirety, and has no hole that penetrates in the plate-thickness direction thereof.

The shape and size of the profile of the first piston member 62 is substantially the same as the shape and size of the profile of the flange 72 of the second piston member 64. A seal installation groove 65 extends circumferentially between the outer peripheral edge of the first piston member 62 and the outer peripheral edge of the second piston member 64. More specifically, the seal installation groove 65 extends in an oval shape, which is the same as that of the piston main body 60 (the first piston member 62 and the second piston member 64).

For manufacturing the piston assembly 10B, in the same manner as the aforementioned piston assembly 10A according to the first embodiment, initially, the first piston member 62 and the second piston member 64 are joined by projection welding, and thereafter, the piston main body 60 and the piston rod 15 are joined by projection welding. In this manner, as shown in FIG. 4A and FIG. 5, the piston assembly 10B, which is constituted from the first piston member 62, the second piston member 64, and the piston rod 15, is obtained.

In this case, the first piston member 62 and the second piston member 64 may be joined integrally by an adhesive, without providing the welding projections 74 on the second piston member 64. Further, the piston rod 15 and the piston main body 60 may be joined integrally by an adhesive, without providing the welding projection 58 on the piston rod 15.

A seal member 19 is mounted on an outer circumferential portion (seal installation groove 65) of the piston main body 60 of the piston assembly 10B, which is manufactured in the foregoing manner, and the piston assembly 10B is arranged slidably in the interior of the housing 12 (see FIG. 1) to thereby be assembled as the fluid pressure cylinder 11.

In the second embodiment, concerning respective constituent elements thereof that are common with the first embodiment, it is a matter of course that the obtained operations and effects are the same or similar to those operations and effects possessed by the respective common constituent elements in the first embodiment.

Third Embodiment

Figure 7:
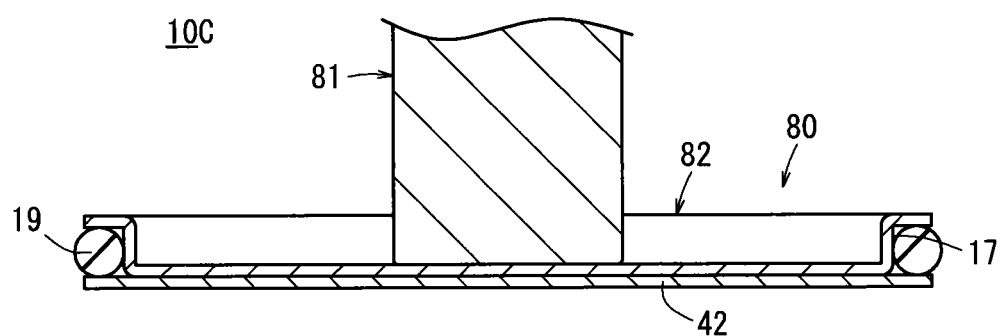
FIG. 7 is a vertical cross sectional view of a condition in which a seal member of the piston assembly shown in FIG. 6A is installed.

Next, with reference to FIGS. 6A through 7, a piston assembly 10C according to a third embodiment will be described. In the piston assembly 10C according to the third embodiment, elements thereof, which impart the same functions and effects as those of the piston assembly 10A according to the first embodiment, are denoted by the same reference characters and details thereof are omitted.

The piston assembly 10C according to the third embodiment includes a piston main body 80, and a piston rod 81 connected to the piston main body 80. The piston rod 81 is constructed with the fitting portion 56 being omitted from the piston rod 15 shown in FIG. 1, etc. A welding projection 58, which is the same as the welding projection 58 shown in FIG. 3C, is provided on a proximal end surface of the piston rod 81.

The piston main body 80 is constituted from a first piston member 82 and the second piston member 42. The first piston member 82 is constructed with the through hole 47 being omitted from the first piston member 40 shown in FIG. 2B, etc. More specifically, with the third embodiment, a through hole that penetrates in the plate-thickness direction is not provided in the first piston member 82, and the first piston member 82 is made up from a flat plate having a predetermined plate thickness over the entirety thereof. The second piston member 42 has the same structure as the second piston member 42 shown in FIGS. 2A and 2B.

For manufacturing the piston assembly 10C, in the same manner as the aforementioned piston assembly 10A according to the first embodiment, initially, the first piston member 82 and the second piston member 42 are joined by projection welding. Thereafter, the piston main body 80 and the piston rod 81 are joined by projection welding. In this case, with the present embodiment, the proximal end of the piston rod 81 is made to abut against a center portion of the first piston member 82, and in a condition in which pressure is applied in the axial direction to the piston rod 81 and the piston main body 80, both members are energized electrically. Accordingly, accompanying resistance heating thereof, by melting of the welding projection 58 disposed on the piston rod 81, as shown in FIG. 7, the piston main body 80 (first piston member 82) and the piston rod 81 are joined mutually. In this manner, the piston assembly 10C, which is constituted from the first piston member 82, the second piston member 42, and the piston rod 81, is obtained.

In this case, the first piston member 82 and the second piston member 42 may be joined integrally by an adhesive, without providing the welding projections 44 on the second piston member 42. Further, the piston rod 81 and the piston main body 80 may be joined integrally by an adhesive, without providing the welding projection 58 on the piston rod 81.

A seal member 19 is mounted on an outer circumferential portion (seal installation groove 17) of the piston main body 80 of the piston assembly 10C, which is manufactured in the foregoing manner, and the piston assembly 10C is arranged slidably in the interior of the housing 12 (see FIG. 1) to thereby be assembled as the fluid pressure cylinder 11.

In the third embodiment, concerning respective constituent elements thereof that are common with the first embodiment, it is a matter of course that the obtained operations and effects are the same or similar to those operations and effects possessed by the respective common constituent elements in the first embodiment.

Fourth Embodiment

Figure 9:
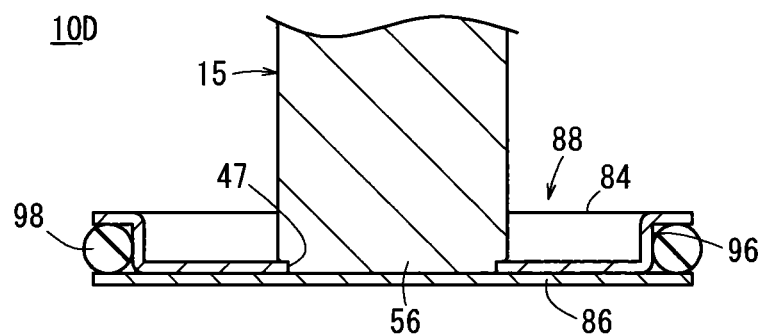
FIG. 9 is a vertical cross sectional view of a condition in which a seal member of the piston assembly shown in FIG. 8A is installed.

In a piston assembly 10D according to a fourth embodiment shown in FIGS. 8A through 9, a piston main body 88, which is made up from a first piston member 84 and a second piston member 86, may be constituted with a circular shape. Apart from being circular shaped overall, the piston main body 88 (the first piston member 84 and the second piston member 86) has the same structure as the piston main body 13 (the first piston member 40 and the second piston member 42) shown in FIG. 2B, etc.

More specifically, the first piston member 84 includes a flat circular-shaped base member 90, a cylindrical side circumferential wall portion 92 that extends out in the axial direction from the entire circumference of the rim of the base member 90, and a flange 94 that spreads outward radially over the entire circumference from an end (an end on the distal end side of the piston rod 15) of the side circumferential wall portion 92. A circular through hole 47 is formed in the center of the base member 90 and penetrates in the plate-thickness direction thereof.

The second piston member 86 is circular-shaped and substantially flat-plate-shaped in its entirety, and as shown in FIG. 8B, prior to welding the first piston member 84 and the second piston member 86, a plurality of (four as exemplified in the drawing) welding projections (first welding projections) 44 are disposed on a surface of the second piston member 86 that is to be joined with the first piston member 84. The second piston member 86 has a predetermined plate-thickness in its entirety, and has no hole that penetrates in the plate-thickness direction thereof. The outer diameters of the first piston member 84 and the second piston member 86 are substantially the same mutually.

An annular seal installation groove 96 that extends circumferentially is formed by the flange 94 and the side circumferential wall portion 92 of the first piston member 84, and the outer peripheral edge of the second piston member 86.

The piston assembly 10D can be assembled using the same procedure as that used for assembling the piston assembly 10A according to the first embodiment. As shown in FIG. 9, a ring-shaped seal member 98, which is made from an elastic material (e.g., a rubber material), is mounted on the outer circumferential portion (seal installation groove 96) of the piston main body 88 of the piston assembly 10D. The piston assembly 10D with the seal member 98 mounted thereon is arranged slidably in the interior of a housing having a slide hole with a circular shape in cross section, to thereby be assembled as a fluid pressure cylinder.

In accordance with the piston assembly 10D according to the fourth embodiment, the same advantages and effects as those of the piston assembly 10A according to the first embodiment are obtained.

Fifth Embodiment

Next, with reference to FIGS. 10A through 11, a piston assembly 10E according to a fifth embodiment will be described. In the piston assembly 10E according to the fifth embodiment, constituent elements thereof, which are the same as those of the piston assemblies 10A, 10D according to the first and fourth embodiments, are denoted by the same reference characters and details thereof are omitted.

The piston assembly 10E according to the fifth embodiment differs from the piston assembly 10D according to the fourth embodiment in relation to the construction of a piston main body 100. The piston main body 100 is constituted from a first piston member 84, a second piston member 86, and a third piston member 106. The first piston member 84 and the second piston member 86, respectively, are constructed in the same manner as the first piston member 84 and the second piston member 86 shown in FIGS. 8A and 8B.

The third piston member 106 includes a circular ring-shaped base member 108 with a circular opening 107 disposed therein, a side circumferential wall portion 110 that extends out in the axial direction from the entire circumference of the rim of the base member 108, and a flange 112 that spreads outwardly in a radial direction over the entire circumference from an end (an end on an opposite side from the piston rod 15 with the second piston member 86 acting as a reference) of the side circumferential wall portion 110.

Although, as shown in the illustrated example, the circular opening 107 is provided in the base member 108 of the third piston member 106, the circular opening 107 may be omitted. More specifically, the third piston member 106 may be constituted without a hole that penetrates in the plate-thickness direction. As shown in FIG. 10B, the third piston member 106, prior to welding of the second piston member 86 and the third piston member 106, includes a plurality of (four as exemplified in the drawing) welding projections 114 disposed on a surface thereof that is to be joined with the second piston member 86. As shown in the drawing, the welding projections 114 are disposed circumferentially at equal intervals on the third piston member 106.

The shape and size of the profile of the flange 112 of the third piston member 106, and the shape and size of the profile of the second piston member 86 are substantially the same. As shown in FIG. 10A, by means of the outer peripheral edge of the second piston member 86, and the side circumferential wall portion 110 and the flange 112 of the third piston member 106, a groove 116 is formed that extends circumferentially over a range of 360°.

For manufacturing the piston assembly 10E, in the same manner as the aforementioned piston assembly 10A according to the first embodiment, initially, the first piston member 84 and the second piston member 86 are joined by projection welding. Thereafter, the second piston member 86 (the second piston member 86 with the first piston member 84 joined thereto) and the third piston member 106 are joined by projection welding. In this case, more specifically, in a condition in which the second piston member 86 and the third piston member 106 are superimposed concentrically and pressure is applied thereto, both members are energized electrically. Upon being energized, the welding projections 114 provided on the third piston member 106 are melted by resistance heating, whereupon the second piston member 86 and the third piston member 106 are joined together mutually. In this manner, the piston main body 100, which is made up from the first piston member 84, the second piston member 86, and the third piston member 106, is manufactured. Alternatively, the first piston member 84 and the second piston member 86 may be joined together after the second piston member 86 and the third piston member 106 have been joined.

Next, the piston main body 100 and the piston rod 15 are joined mutually by projection welding. Welding in this case can be performed according to the welding technique used for the piston main body 13 and the piston rod 15 in the first embodiment. As a result, the piston assembly 10E, which is constituted from the first piston member 84, the second piston member 86, the third piston member 106, and the piston rod 15, is obtained.

In this case, the first piston member 84 and the second piston member 86 may be joined integrally by an adhesive, without providing the welding projections 44 on the second piston member 86. Further, the second piston member 86 and the third piston member 106 may be joined integrally by an adhesive, without providing the welding projections 114 on the third piston member 106. The piston rod 15 and the piston main body 100 may be joined integrally by an adhesive, without providing the welding projection 58 on the piston rod 15.

Figure 11:
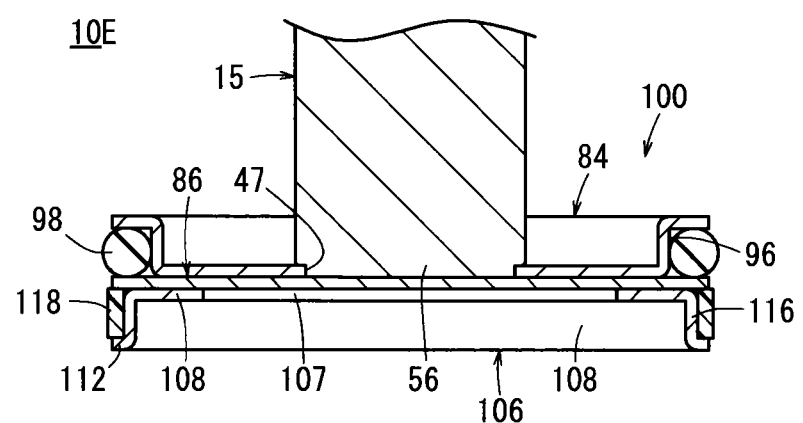
FIG. 11 is a vertical cross sectional view of a condition in which a seal member and a wear ring of the piston assembly shown in FIG. 10A are installed.

As shown in FIG. 11, a ring-shaped seal member 98, which is made from an elastic material (e.g., a rubber material), is mounted on the outer circumferential portion (seal installation groove 96) of the piston main body 100 of the manufactured piston assembly 10E, and a ring-shaped or C-shaped wear ring (support member) 118, which is made from a low-friction material, is disposed in the groove 116. As suitable low-friction materials, for example, there may be cited synthetic resin materials equipped with both wear resistance and low friction, such as tetrafluoroethylene (PTFE), or metal materials or the like. In a condition in which the wear ring 118 is installed in the groove 116, the outer diameter of the wear ring 118 is greater than the outer diameters of the second piston member 86 and the third piston member 106.

The piston assembly 10E with the seal member 98 and the wear ring 118 mounted thereon is arranged slidably in the interior of a housing having a slide hole with a circular shape in cross section, to thereby be assembled as a fluid pressure cylinder. Since the wear ring 118 is made from a low-friction material, the coefficient of friction developed between the inner circumferential surface of the slide hole and the wear ring 118 is smaller than the coefficient of friction between the inner circumferential surface of the slide hole and the seal member 98.

During operation of the fluid pressure cylinder equipped with the piston assembly 10E, in the event that a large lateral load, which acts in a direction perpendicular to the axial direction, is applied to the piston main body 100, the outer circumferential surface of the wear ring 118, which projects outwardly beyond the outermost circumferential portion of the piston main body 100, is placed in contact with the slide hole, whereby the outer circumference of the piston main body 100 is prevented from contacting the inner circumferential surface of the slide hole.

In the case of the piston assembly 10E according to the present embodiment, since the third piston member 106 constituting the groove 116 for installation of the wear ring 118 is made from a plate-like member, an increase in the axial width thereof is suppressed, while the piston main body 100 can be constructed having the groove 116 for enabling installation of the wear ring 118. Accordingly, by provision of the wear ring 118, along with shortening the width of the piston main body 100, the piston assembly 10E can be offered in which the overall length thereof is shortened.

Further, the same advantages and effects as those of the piston assembly 10A according to the first embodiment are obtained in accordance with the piston assembly 10E according to the fifth embodiment.

As modifications of the piston assembly 10E, the piston main body 100 may be constituted in an oval shape in the same manner as the piston main body 13 of the first embodiment, or alternatively, in an elliptical shape.

With the piston assembly 10E, the seal member 98 is disposed between the first piston member 84 and the second piston member 86, and the wear ring 118 is disposed between the second piston member 86 and the third piston member 106. However, the seal member 98 and the wear ring 118 may be arranged in opposite locations. More specifically, the wear ring 118 may be disposed between the first piston member 84 and the second piston member 86, and the seal member 98 may be disposed between the second piston member 86 and the third piston member 106.

Sixth Embodiment

Figure 12A:
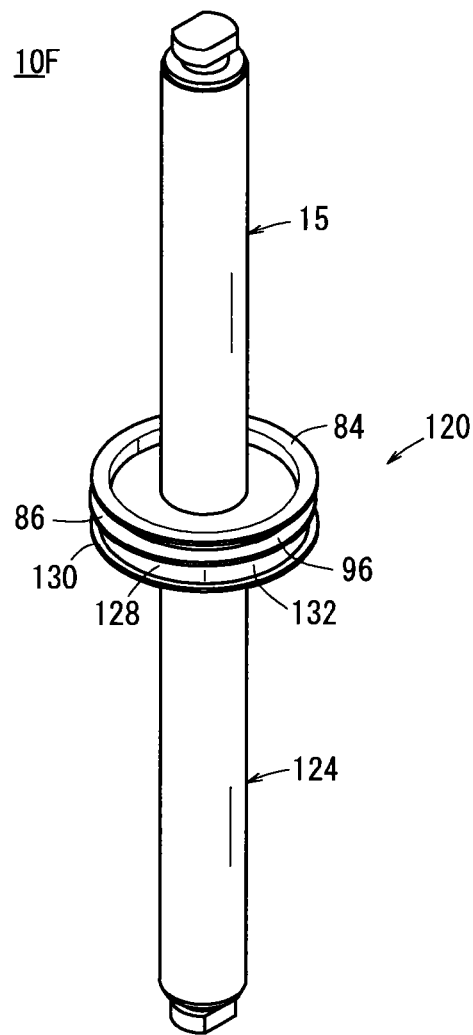
FIG. 12A is a perspective view of a piston assembly according to a sixth embodiment of the present invention.

Next, with reference to FIGS. 12A through 13, a piston assembly 10F according to a sixth embodiment will be described. In the piston assembly 10F according to the sixth embodiment, constituent elements thereof, which are the same as those of the piston assemblies 10A, 10D according to the first and fourth embodiments, are denoted by the same reference characters and details thereof are omitted.

The piston assembly 10F according to the sixth embodiment, with respect to the piston assembly 10D according to the fourth embodiment, is further equipped with a third piston member 122 and a second piston rod 124. More specifically, with the present embodiment, a piston main body 120 is constituted by the first piston member 84, the second piston member 86, and the third piston member 122, together with the piston rod 15 and the second piston rod 124, which is arranged on an opposite side, being disposed to sandwich the piston main body 120 therebetween. Below, in the present embodiment, the term "first piston rod 15" will be used to refer to the piston rod 15.

The third piston member 122 includes a circular base member 126, a cylindrical side circumferential wall portion 128 that extends out in the axial direction from the entire circumference of the rim of the base member 126, and a flange 130 that spreads outwardly in a radial direction over the entire circumference from an end (an end on an opposite side from the piston rod with the second piston member 86 acting as a reference) of the side circumferential wall portion 128. A circular through hole 131 is formed to penetrate in the plate-thickness direction in the center of the base member 126.

Figure 12B:
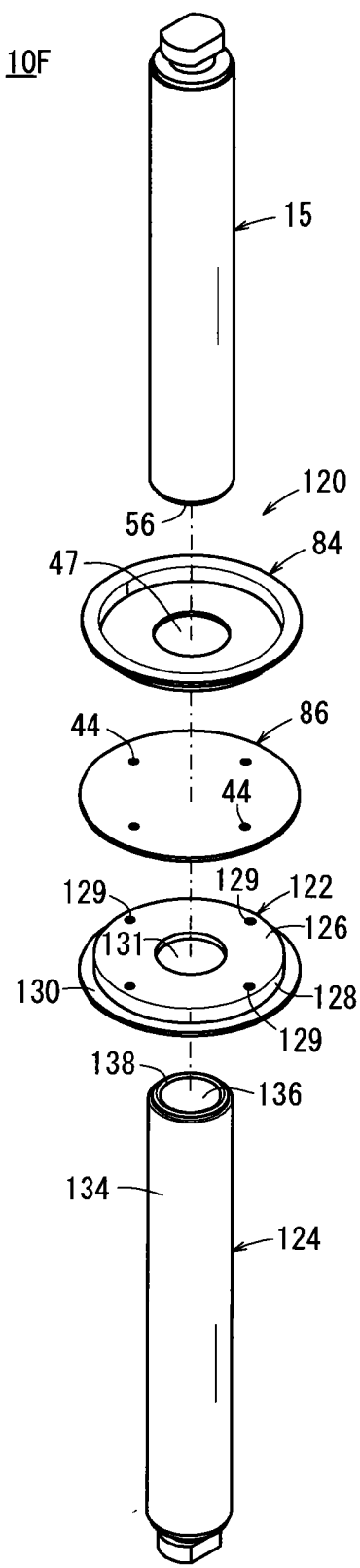
FIG. 12B is an exploded perspective view of the piston assembly shown in FIG. 12A.

As shown in FIG. 12B, on the third piston member 122, prior to being joined to the second piston member 86 by welding, a plurality of (four as exemplified in the drawing) welding projections 129 are disposed on a surface thereof that is to be joined with the second piston member 86. On the illustrated third piston member 122, the welding projections 129 are disposed circumferentially at equal intervals. The through hole 131 of the third piston member 122 has the same diameter as the through hole 47 of the first piston member 84.

The shape and size of the profile of the flange 130 of the third piston member 122, and the shape and size of the profile of the second piston member 86 are the same or substantially the same. As shown in FIG. 12A, by means of the outer peripheral edge of the second piston member 86, and the side circumferential wall portion 128 and the flange 130 of the third piston member 122, a groove 132 is formed that extends circumferentially over a range of 360°.

In the present embodiment, the first piston member 84, the second piston member 86, and the third piston member 122 are constituted from non-magnetic metals. As suitable non-magnetic metals, there may be cited aluminum alloys, copper alloys, zinc alloys, stainless steel, etc.

The second piston rod 124 is constructed as with the case with the first piston rod 15. More specifically, the second piston rod 124 includes a body portion 134, and a fitting portion 136, which is disposed on a proximal end of the body portion 134. A welding projection 138 is provided on the second piston rod 124 prior to welding thereof with the piston main body 120. The body portion 134, the fitting portion 136, and the welding projection 138 are similar in construction respectively to the body portion 54, the fitting portion 56, and the welding projection 58 on the first piston rod 15 (see FIG. 3C).

For manufacturing the piston assembly 10F, in the same manner as the aforementioned piston assembly 10A according to the first embodiment, initially, the first piston member 84 and the second piston member 86 are joined by projection welding. Thereafter, the second piston member 86 (the second piston member 86 with the first piston member 84 joined thereto) and the third piston member 122 are joined by projection welding. In this case, more specifically, in a condition in which the second piston member 86 and the third piston member 122 are superimposed concentrically and pressure is applied thereto, both members are energized electrically.

Upon being energized, the welding projections 129 provided on the third piston member 122 are melted by resistance heating, whereupon the second piston member 86 and the third piston member 122 are joined together mutually. In this manner, the piston main body 120, which is made up from the first piston member 84, the second piston member 86, and the third piston member 122, is manufactured. Alternatively, the first piston member 84 and the second piston member 86 may be joined together after the second piston member 86 and the third piston member 122 have been joined.

Next, the piston main body 120 and the first piston rod 15 are joined mutually by projection welding, and the piston main body 120 and the second piston rod 124 are joined mutually by projection welding. Welding of the piston main body 120 and the first piston rod 15 can be performed according to the welding technique used for the piston main body 13 and the piston rod 15 in the first embodiment.

To join the piston main body 120 and the second piston rod 124, first, a proximal end of the second piston rod 124 is made to abut against the piston main body 120. More specifically, the fitting portion 136 provided on the proximal end of the second piston rod 124 is fitted in the through hole 131 of the third piston member 122. Consequently, positioning of the second piston rod 124 with respect to the piston main body 120 can be performed easily and accurately. Further, at this time, the welding projection 138 provided on the second piston rod 124 abuts against the second piston member 86.

In addition, in a condition in which pressure is applied to the second piston rod 124 and the piston main body 120 in the axial direction, both members are energized electrically. Upon being energized, the welding projection 138 provided on the second piston rod 124 is melted by resistance heating, and as shown in FIG. 13, the piston main body 120 (second piston member 86) and the second piston rod 124 are joined together mutually. In this manner, the piston assembly 10F, which is constituted from the first piston member 84, the second piston member 86, the third piston member 122, the first piston rod 15, and the second piston rod 124, is obtained.

Concerning the timing at which welding of the piston main body 120 and the first piston rod 15 is implemented, and the timing at which welding of the piston main body 120 and the second piston rod 124 is implemented, either one may be performed first, or both may be performed simultaneously.

Alternatively, the first piston member 84 and the second piston member 86 may be joined integrally by an adhesive, without providing the welding projections 44 on the second piston member 86. Further, the second piston member 86 and the third piston member 122 may be joined integrally by an adhesive, without providing the welding projections 129 on the third piston member 122. The first piston rod 15 and the piston main body 120 may be joined integrally by an adhesive, without providing the welding projection 58 on the first piston rod 15. The second piston rod 124 and the piston main body 120 may be joined integrally by an adhesive, without providing the welding projection 138 on the second piston rod 124.

Figure 13:
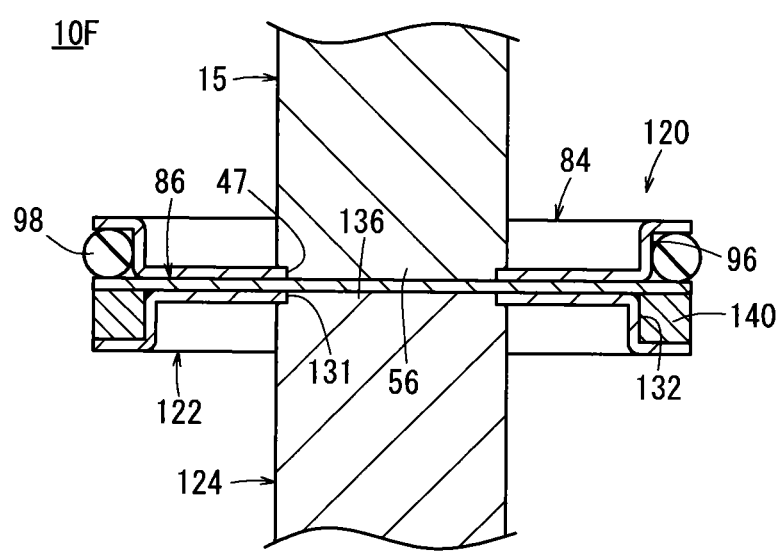
FIG. 13 is a vertical cross sectional view of a condition in which a seal member and a magnet of the piston assembly shown in FIG. 12A are installed.

As shown in FIG. 13, a ring-shaped seal member 98 is mounted on an outer circumferential portion (seal installation groove 96) of the piston main body 120 of the piston assembly 10F, and a magnet (permanent magnet) 140 is disposed in the groove 132. The magnet 140 is made of carbon steel, cobalt steel, Alnico, synthetic rubber, or other materials. The magnet 140 may be ring-shaped, or may be divided into plural sections in the circumferential direction. In the case that the magnet 140 is ring-shaped, the magnet 140 is installed on the side circumferential wall portion 128 of the third piston member 122, prior to the second piston member 86 and the third piston member 122 being joined.

The piston assembly 10F with the seal member 98 and the magnet 140 mounted thereon is arranged slidably in the interior of a housing having a slide hole that is circular in cross section, to thereby be assembled as a fluid pressure cylinder. In this case, on an outer surface of the housing, magnetic sensors are attached at positions corresponding to both stroke ends of the piston main body 120. Magnetism generated by the magnet 140 is sensed by the magnetic sensors, whereby the displacement position of the piston main body 120 is detected.

The piston assembly 10F according to the present embodiment is of a so-called "double rod type" having the first piston rod 15 and the second piston rod 124. However, compared to a conventional double rod type of piston assembly, the width (thickness in the axial direction) of the piston main body 120 can be shortened. Accordingly, the total length of the piston assembly 10F can be made shorter, the device overall can be made smaller in scale, and costs therefor can be kept low.

Further, the same advantages and effects as those of the piston assembly 10A according to the first embodiment are obtained in accordance with the piston assembly 10F according to the sixth embodiment.

As a modification of the piston assembly 10F, a form may be adopted that does not include the second piston rod 124. Further, as another modification of the piston assembly 10F, the piston main body 120 may be constituted in an oval shape in the same manner as the piston main body 13 of the first embodiment, or alternatively, in an elliptical shape.

With the piston assembly 10F, the seal member 98 is disposed between the first piston member 84 and the second piston member 86, and the magnet 140 is disposed between the second piston member 86 and the third piston member 122. However, the seal member 98 and the magnet 140 may be arranged in opposite locations. More specifically, the magnet 140 may be disposed between the first piston member 84 and the second piston member 86, and the seal member 98 may be disposed between the second piston member 86 and the third piston member 122.

Other Modifications

In the aforementioned embodiments, the respective constituent elements of the piston assemblies 10A through 10F are joined by projection welding. However, the present invention is not limited to this feature, and the respective constituent elements of the piston assemblies 10A through 10F may be joined by other welding methods aside from projection welding.

Although preferred embodiments of the present invention have been described above, the present invention is not limited to the aforementioned embodiments, and various changes and modifications may be made thereto without departing from the scope of the invention.

The invention claimed is:

1. A piston assembly comprising:
a piston main body; and
a piston rod joined to the piston main body, wherein:
the piston rod includes a cylindrical body portion;
the piston main body includes a first piston member and a second piston member which are constituted from plate-like members;
the first piston member and the second piston member are joined mutually under a condition of being superimposed in an axial direction of the piston rod;
a seal installation groove that extends in a circumferential direction is formed between an outer peripheral edge of the first piston member and an outer peripheral edge of the second piston member;
a through hole is provided in the first piston member so as to penetrate in a plate thickness direction thereof;
the second piston member has, over the entirety thereof, a plate thickness that is smaller than an outer diameter of the piston rod;
a fitting portion is provided on a proximal end of the cylindrical body portion to project from the proximal end of the piston rod in the axial direction of the piston rod, the fitting portion being fitted in the through hole;
the fitting portion has an outer diameter which is smaller than that of the cylindrical body portion and the fitting portion has an end surface that is joined to the second piston member by welding,
the end surface of the fitting portion is joined with an end surface of the second piston member located on a side of the second piston member that faces toward the first piston member;
the end surfaces of the fitting portion and the second piston member that are joined with each other are perpendicular to an axis of the piston rod; and
the outer diameter of the fitting portion is the same as, or slightly smaller than, the inner diameter of the through hole,
wherein one of the first piston member and the second piston member includes:
a first radial direction portion that extends in a radial direction perpendicular to the axis of the piston rod;
an axial direction portion that extends parallel to the axis of the piston rod, projects from an outer end of the first radial direction portion to a direction away from the other one of the first piston member and the second piston member, and includes
a first end portion that is located at an end connected to the outer end of the first radial direction portion,
a second end portion that is located at the other end of the axial direction portion,
a second radial direction portion that projects radially outward from the second end portion of the axial direction portion and extends in the radial direction perpendicular to the axis of the piston rod,
the first radial direction portion, the axial direction portion, and the second radial direction portion being molded together as a single press-molded product,
the axial direction portion constitutes a bottom wall of the seal installation groove, and
the second radial direction portion constitutes one of side walls of the seal installation groove.

2. The piston assembly according to claim 1, wherein:
the piston main body includes a third piston member constituted from a plate-like member; and
on an outer peripheral portion of the piston main body, a support member or a magnet that extends along an outer circumference of the piston main body is disposed in a groove formed between the second piston member and the third piston member.

3. The piston assembly according to claim 1, wherein:
the piston rod is joined as a first piston rod to one side of the piston main body by welding; and
a second piston rod is joined to another side of the piston main body.

4. The piston assembly according to claim 1, wherein:
the first piston member and the second piston member are joined by welding.

5. The piston assembly according to claim 1, wherein the fitting portion is joined only with the surface of the second piston member located on the side of the second piston member that faces toward the first piston member.

6. The piston assembly according to claim 1, wherein a joining surface between the first piston member and the second piston member is coplanar with a joining surface between the piston rod and the second piston member.

7. A fluid pressure cylinder comprising:
a piston assembly; and
a housing that accommodates the piston assembly therein movably in the axial direction, wherein:
the piston assembly comprises:
a piston main body; and
a piston rod joined to the piston main body, wherein:
the piston rod includes a cylindrical body portion;
the piston main body includes a first piston member and a second piston member which are constituted from plate-like members;
the first piston member and the second piston member are joined mutually under a condition of being superimposed in an axial direction of the piston rod;
a seal installation groove that extends in a circumferential direction is formed between an outer peripheral edge of the first piston member and an outer peripheral edge of the second piston member; and
a through hole is provided in the first piston member so as to penetrate in a plate thickness direction thereof;
the second piston member has, over the entirety thereof, a plate thickness that is smaller than an outer diameter of the piston rod;
a fitting portion is provided on a proximal end of the cylindrical body portion to project from the proximal end of the piston rod in the axial direction of the piston rod, the fitting portion being fitted in the through hole;
the fitting portion has an outer diameter which is smaller than that of the cylindrical body portion and the fitting portion has an end surface that is joined to the second piston member by welding,
the end surface of the fitting portion is joined with an end surface of the second piston member located on a side of the second piston member that faces toward the first piston member; the end surfaces of the fitting portion and the second piston member that are joined with each other are perpendicular to an axis of the piston rod; and
the outer diameter of the fitting portion is the same as, or slightly smaller than, the inner diameter of the through hole,
wherein one of the first piston member and the second piston member includes:

a first radial direction portion that extends in a radial direction perpendicular to the axis of the piston rod;

an axial direction portion that extends parallel to the axis of the piston rod, projects from an outer end of the first radial direction portion to a direction away from the other one of the first piston member and the second piston member, and includes a first end portion that is located at an end connected to the outer end of the first radial direction portion, a second end portion that is located at the other end of the axial direction portion, a second radial direction portion that projects radially outward from the second end portion of the axial direction portion and extends in the radial direction perpendicular to the axis of the piston rod, the first radial direction portion, the axial direction portion, and the second radial direction portion being molded together as a single press-molded product, the axial direction portion constitutes a bottom wall of the seal installation groove, and the second radial direction portion constitutes one of side walls of the seal installation groove.

8. The fluid pressure cylinder according to claim 7, wherein the fitting portion is joined only with the surface of the second piston member located on the side of the second piston member that faces toward the first piston member.

9. The fluid pressure cylinder according to claim 7, wherein a joining surface between the first piston member and the second piston member is coplanar with a joining surface between the piston rod and the second piston member.

10. A method for manufacturing a piston assembly comprising:

a first step of superimposing a first piston member and a second piston member which are constituted from plate-like members, and joining both members to obtain a piston main body; and a second step of joining a piston rod to the piston main body, wherein:

a seal installation groove that extends in a circumferential direction is formed between an outer peripheral edge of the first piston member and an outer peripheral edge of the second piston member; and wherein a through hole is provided in the first piston member so as to penetrate in a plate thickness direction thereof;

the second piston member has, over the entirety thereof, a plate thickness that is smaller than an outer diameter of the piston rod;

a fitting portion is provided on a proximal end of a cylindrical body portion of the piston rod to project from the proximal end of the piston rod in the axial direction of the piston rod, the fitting portion being fitted in the through hole;

the fitting portion has an outer diameter which is smaller than that of the cylindrical body portion and the fitting portion has an end surface that is joined to the second piston member by welding, the end surface of the fitting portion is joined with an end surface of the second piston member located on a side of the second piston member that faces toward the first piston member; the end surfaces of the fitting portion and the second piston member that are joined with each other are perpendicular to an axis of the piston rod; and the outer diameter of the fitting portion is the same as, or slightly smaller than, the inner diameter of the through hole, wherein one of the first piston member and the second piston member includes:

a first radial direction portion that extends in a radial direction perpendicular to the axis of the piston rod;

an axial direction portion that extends parallel to the axis of the piston rod, projects from an outer end of the first radial direction portion to a direction away from the other one of the first piston member and the second piston member, and includes a first end portion that is located at an end connected to the outer end of the first radial direction portion, a second end portion that is located at the other end of the axial direction portion, a second radial direction portion that projects radially outward from the second end portion of the axial direction portion and extends in the radial direction perpendicular to the axis of the piston rod, the first radial direction portion, the axial direction portion, and the second radial direction portion being molded together as a single press-molded product, the axial direction portion constitutes a bottom wall of the seal installation groove, and the second radial direction portion constitutes one of side walls of the seal installation groove.

11. The method for manufacturing a piston assembly according to claim 10, wherein:

in the first step, the first piston member and the second piston member are joined by welding.

12. The method according to claim 10, wherein the fitting portion is joined only with the surface of the second piston member located on the side of the second piston member that faces toward the first piston member.

13. The method according to claim 10, wherein a joining surface between the first piston member and the second piston member is coplanar with a joining surface between the piston rod and the second piston member.

* * * * *